(12) United States Patent  
Leonard

(10) Patent No.: US 9,134,080 B2  
(45) Date of Patent: Sep. 15, 2015

(54) RECONFIGURABLE FRONT AND UPPER ONE PIECE BAFFLES FOR DIRECTING INCOMING AIR FROM A VEHICLE FRONT FASCIA TO A RADIATOR COOLING MODULE

(71) Applicant: U.S. Farathane Corporation, Auburn Hills, MI (US)

(72) Inventor: Stephen G. Leonard, Waterford, MI (US)

(73) Assignee: U.S. Farathane Corporation, Auburn Hills, MI (US)

(*) Notice: Subject to any disclaimer, the term of this patent is extended or adjusted under 35 U.S.C. 154(b) by 421 days.

(21) Appl. No.: 13/726,943

(22) Filed: Dec. 26, 2012

(65) Prior Publication Data

US 2013/0175011 A1 Jul. 11, 2013

Related U.S. Application Data

(60) Provisional application No. 61/585,196, filed on Jan. 10, 2012.

(51) Int. Cl.

| | |
|---|---|
| *B60K 11/04* | (2006.01) |
| *F28F 21/06* | (2006.01) |
| *B60K 11/08* | (2006.01) |
| *B29C 45/00* | (2006.01) |
| *B29C 45/16* | (2006.01) |

(52) U.S. Cl.
CPC .............. *F28F 21/06* (2013.01); *B60K 11/08* (2013.01); *B29C 45/0017* (2013.01); *B29C 45/1676* (2013.01)

(58) Field of Classification Search
CPC ........... B60K 11/04; B60K 1/00; B60K 11/00

USPC .................. 180/68.6, 68.4, 69.1, 68.1, 68.2
See application file for complete search history.

(56) References Cited

U.S. PATENT DOCUMENTS

| | | | | |
|---|---|---|---|---|
| 4,226,348 A | * | 10/1980 | Dottor et al. | ................ 224/42.34 |
| 4,353,680 A | * | 10/1982 | Hiraoka et al. | ................ 415/222 |
| 4,842,319 A | * | 6/1989 | Ziegler et al. | ................ 180/68.6 |
| 4,844,531 A | * | 7/1989 | Kooiker | ................ 296/100.09 |
| 5,537,506 A | | 7/1996 | Fennesz | |
| 7,077,624 B2 | | 7/2006 | Brown | |
| 7,243,751 B2 | * | 7/2007 | Shigematsu | ................ 180/68.4 |
| 7,455,100 B2 | | 11/2008 | Tallon | |
| 8,256,496 B2 | | 9/2012 | Shuttleworth et al. | |
| 8,613,338 B2 | * | 12/2013 | Rasset et al. | ................ 180/68.4 |
| 2007/0116991 A1 | * | 5/2007 | Balthes et al. | ................ 428/920 |
| 2007/0119564 A1 | | 5/2007 | Contet | |
| 2012/0024494 A1 | | 2/2012 | Grasso et al. | |
| 2013/0074410 A1 | | 3/2013 | Berkeland | |

FOREIGN PATENT DOCUMENTS

FR 2932728 A1 12/2009

* cited by examiner

*Primary Examiner* — Hau Phan
(74) *Attorney, Agent, or Firm* — Gifford, Krass, Sprinkle, Anderson & Citkowski, P.C.; Douglas J. McEvoy

(57) ABSTRACT

A baffle construction constructed of a two part/two shot injection molded material having an integral and three sided body. Each of the sides including a panel section surrounded by a softer interconnecting hinge such that a plurality of living hinges are configured into the body and are located around and between each of a central panel and interconnected side panels. A secondary article is provided and includes an upper baffle assembled along with the lower baffle to define a four sided box-like structure around a vehicle radiator and in order to direct incoming air through a fascia opening and into a cooling module associated with the radiator.

19 Claims, 16 Drawing Sheets

FIG. 6

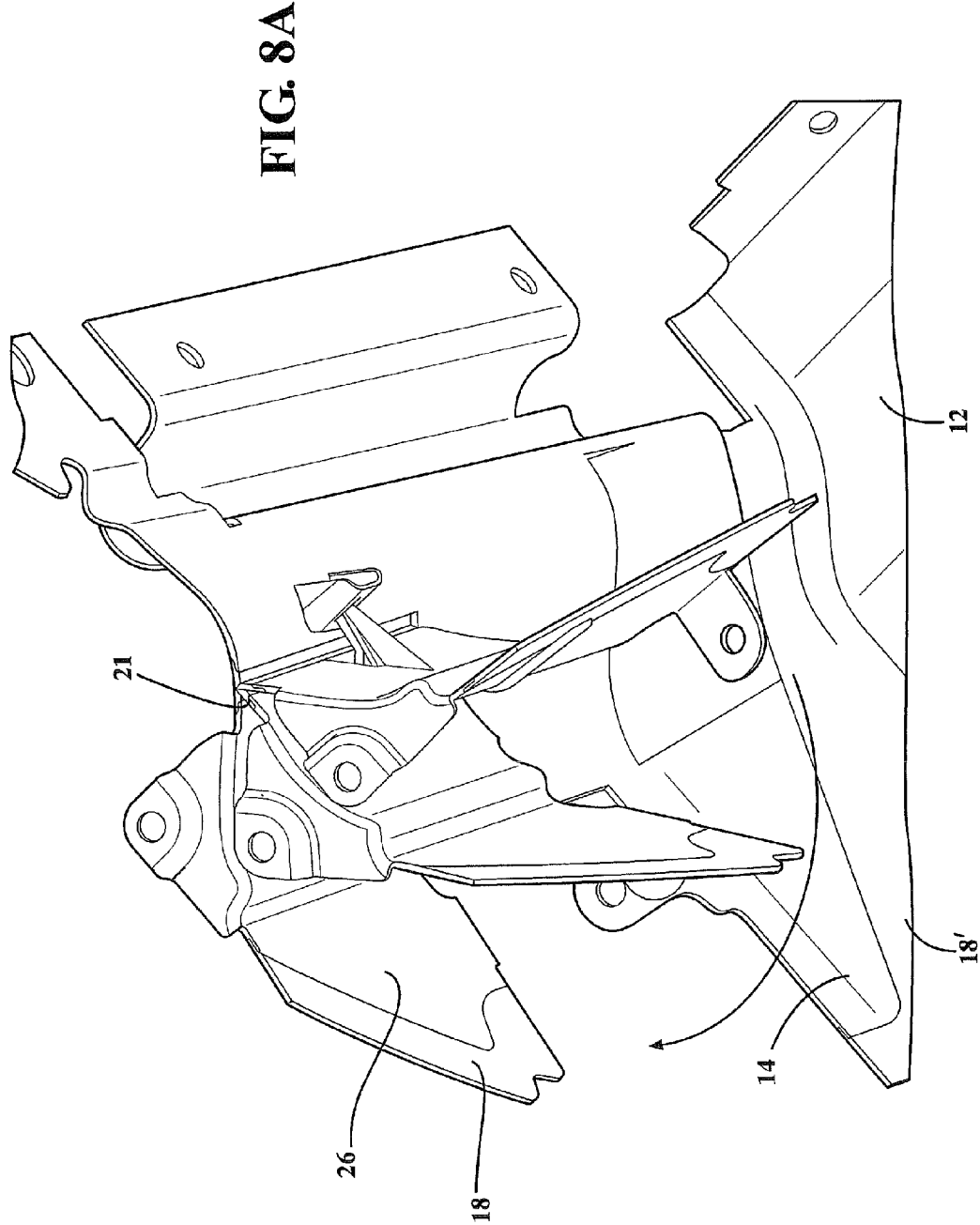

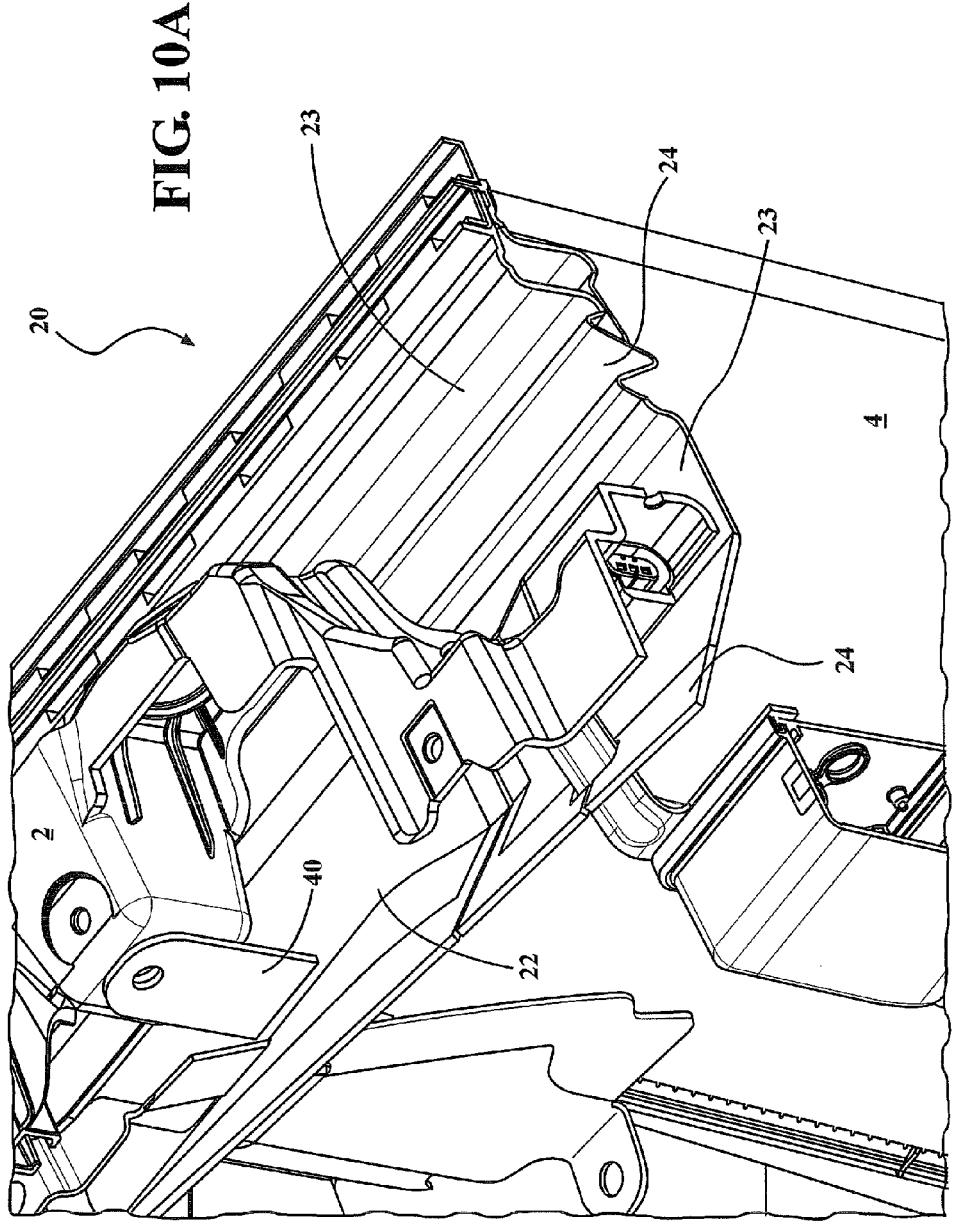

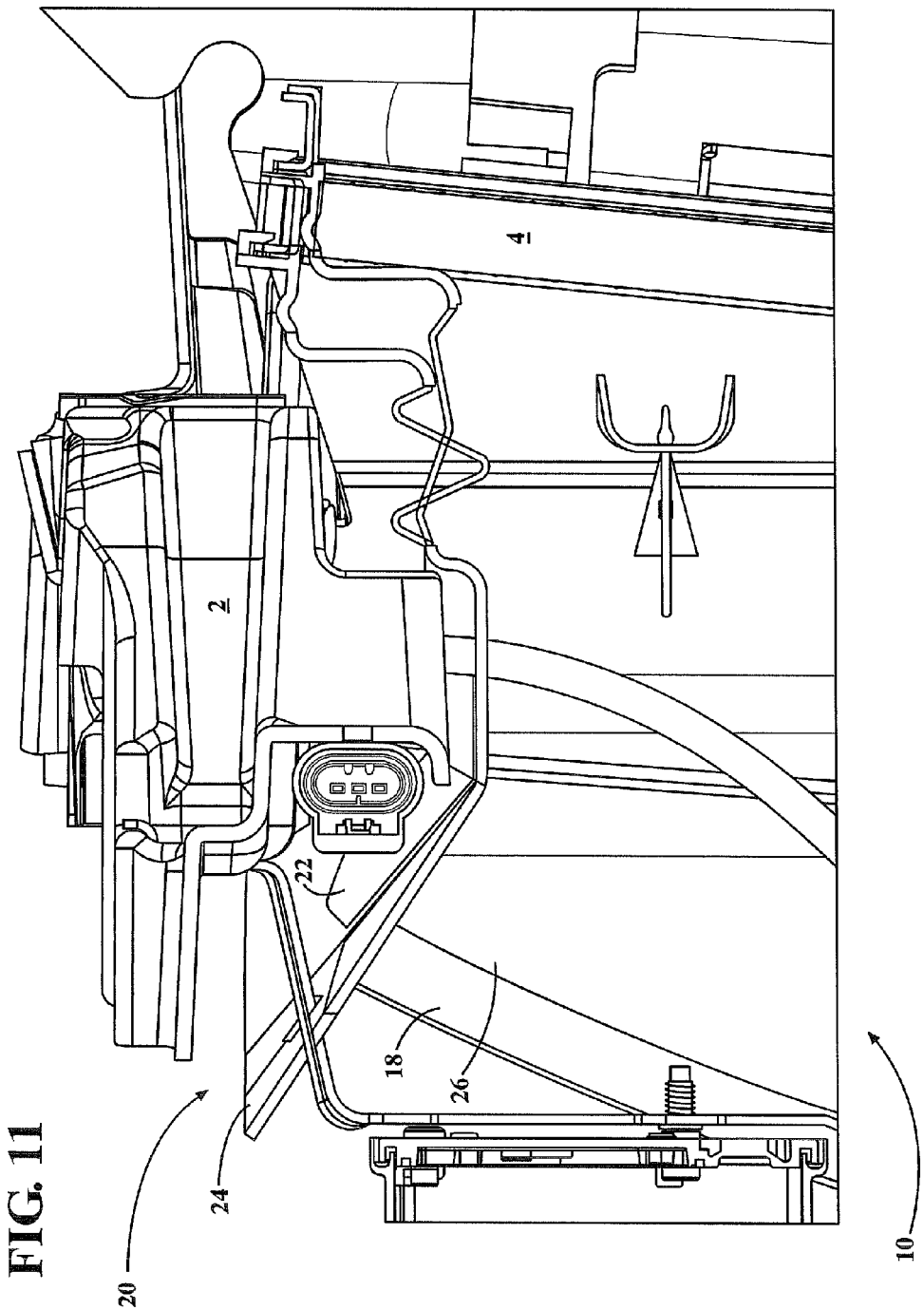

US 9,134,080 B2

RECONFIGURABLE FRONT AND UPPER ONE PIECE BAFFLES FOR DIRECTING INCOMING AIR FROM A VEHICLE FRONT FASCIA TO A RADIATOR COOLING MODULE

CROSS REFERENCE TO RELATED APPLICATIONS

The present application claims the priority of U.S. Ser. No. 61/585,196 filed Jan. 10, 2012.

FIELD OF THE INVENTION

The present invention discloses an improved baffle design for us with a vehicle radiator and cooling module. More specifically, the invention discloses a three sided and flexible lower baffle construction which is constructed of a two part/two shot injection molded material including integrally formed harder body section and softer interconnecting hinge components. An optional upper baffle can be assembled along with the lower baffle to define a four sided box-like structure around the radiator. The baffles further include reconfigurable portions to facilitate installation to varying sized and dimensioned vehicle fascias, bumper bars, radiators and the like.

DESCRIPTION OF THE RELEVANT ART

The prior art is documented with examples of various components designed to baffle or direct incoming air, such as through a fascia opening and into a cooling module or the like. These designs have typically consisted of multi-piece assemblies produced by varying manufacturing methods such as vacuum forming, die cutting, injection molding and two shot molding.

With newer vehicles focusing on higher levels of aero-efficiency and enhanced mileage, two-shot component assemblies have become preferred which allow a "touch" condition with the surrounding components to better establish a sealing condition. In use with a conventional vehicle radiator, a three piece design with a main baffle and opposite edge connecting and side extending baffles is also known and which includes the requirement of multiple molds, attachment fasteners or other features, and an attendant difficulty in packaging and shipping, in large part owing to its overall "U" shape.

SUMMARY OF THE PRESENT INVENTION

The present invention teaches a baffle construction constructed of a two part/two shot injection molded material and which includes an integrally formed body having a first harder panel section and a second softer interconnecting hinge. The two shot material defines a one piece body constructed of a three sided articled including a central body panel and two opposite and interconnected side portions.

The central body panel and side portions each have a specified shape and size and are formed from a first shot harder material including at least an olefinic filled polypropylene. A plurality of living hinges are configured into the body and are located around and between the central panel and interconnected sides. The living hinges each exhibit a specified shape and size and are formed from a second shot softer material including at least one of a thermoplastic elastomer (TPE) or thermoplastic vulcanite (TPV).

A secondary article is provided and includes an upper baffle assembled along with the lower baffle to define a four sided box-like structure around the radiator. The upper baffle includes individual harder first shot panel portions, between and around which are formed additional softer second shot hinge and pivot locations. At least one of the three sided article and secondary article further incorporate reconfigurable portions to facilitate installation to varying sized and dimensioned vehicle fascias, bumper bars, radiators and the like.

BRIEF DESCRIPTION OF THE DRAWINGS

Reference will now be made to the attached drawings, when read in combination with the following detailed description, wherein like reference numerals refer to like parts throughout the several views, and in which:

FIG. 6 is an initial pre-assembly view of the three sided flexible baffle article in combination with a separate assembleable upper baffle;

FIGS. 8 and 8A are perspective and enlarged partial completed assembly views in which the upper baffle is hinged and extended to assemble to the main support bracket and the side pivoting flaps are pivoted into engagement with the associated vehicle bumper beam;

FIGS. 10A and 10B are isometric views depicting portions of the upper and lower baffles in installed arrangement relative to a vehicle radiator and cooling module;

FIG. 11 is a further end cutaway view similar to that depicted in FIGS. 10A and 10B and further illustrating the arrangement of the upper and lower baffles relative to the upper cooling module and condenser of the associated radiator;

DETAILED DESCRIPTION OF THE PREFERRED EMBODIMENTS

Figure 1:
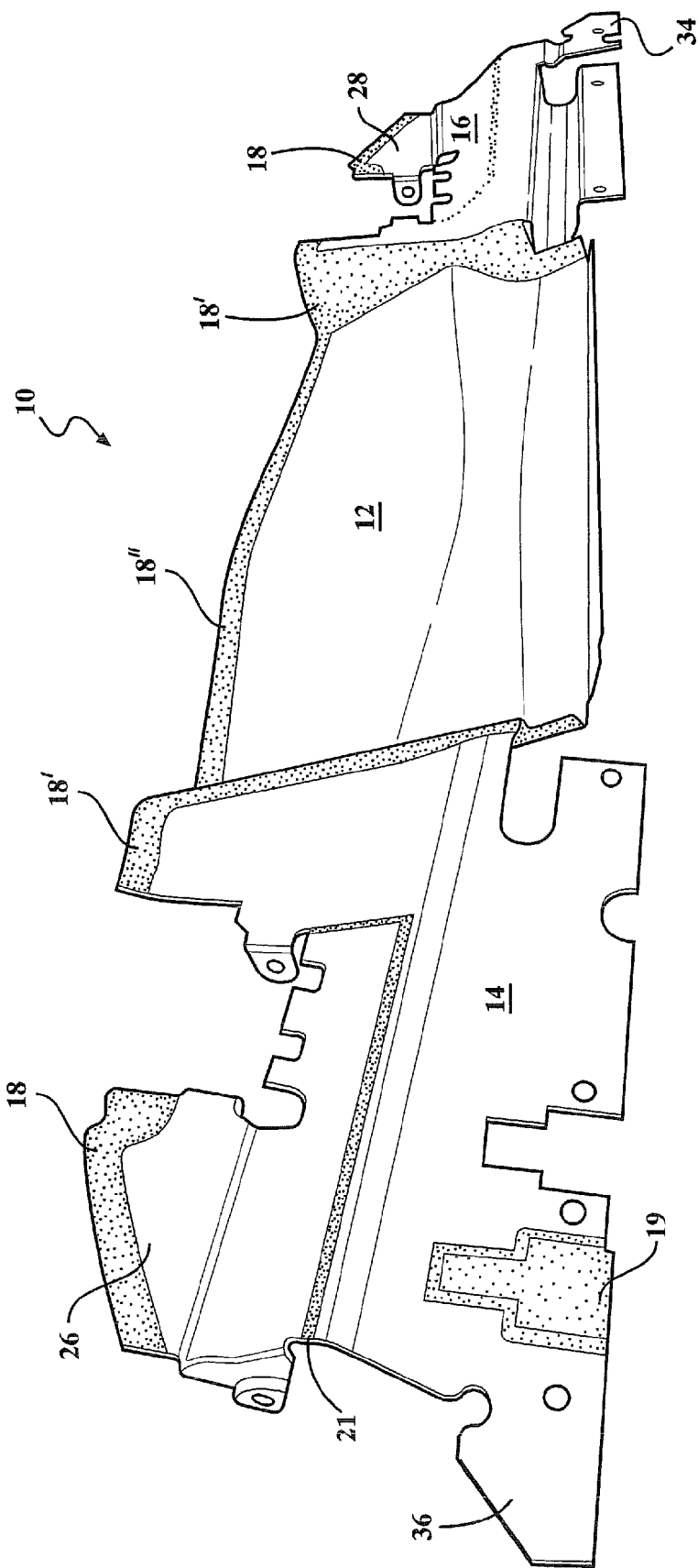
FIG. 1 is a perspective view of a three sided flexible baffle article constructed of a two shot injection molded material including a first harder olefin filled polypropylene bottom and sides and a second softer thermoplastic elastomer or vulcanate hinge material according to the present invention.

Referring initially to FIG. 1, a perspective view is generally depicted at 10 of a three sided flexible lower baffle according to the present invention. In operation, the baffle is fitted underneath and around the sides of a vehicle radiator and which functions, such as in combination with an inter-fitting attachable upper baffle, in order to redirect incoming air through a front vehicle fascia opening and into a cooling module 2 associated with the radiator (see FIGS. 10A-10B, 11 and 13 and which also includes an associated condenser component 4 forming additional structure associated with the vehicle radiator).

As will be further described throughout the several succeeding views, the baffle 10 is constructed of a one piece, three panel and two port foldable/bendable polymeric material and which further provides the ability to easily reconfigure during installation in order to accommodate numerous different vehicle fascia and radiator condenser mount positions. This is further an improvement over prior art baffle designs which require a plurality of individual side pieces which are assembled together at the time of installation and which do not provide a like degree of modifiability in order to reconfigure to fit varying vehicle fascia and radiator designs.

Figure 2:
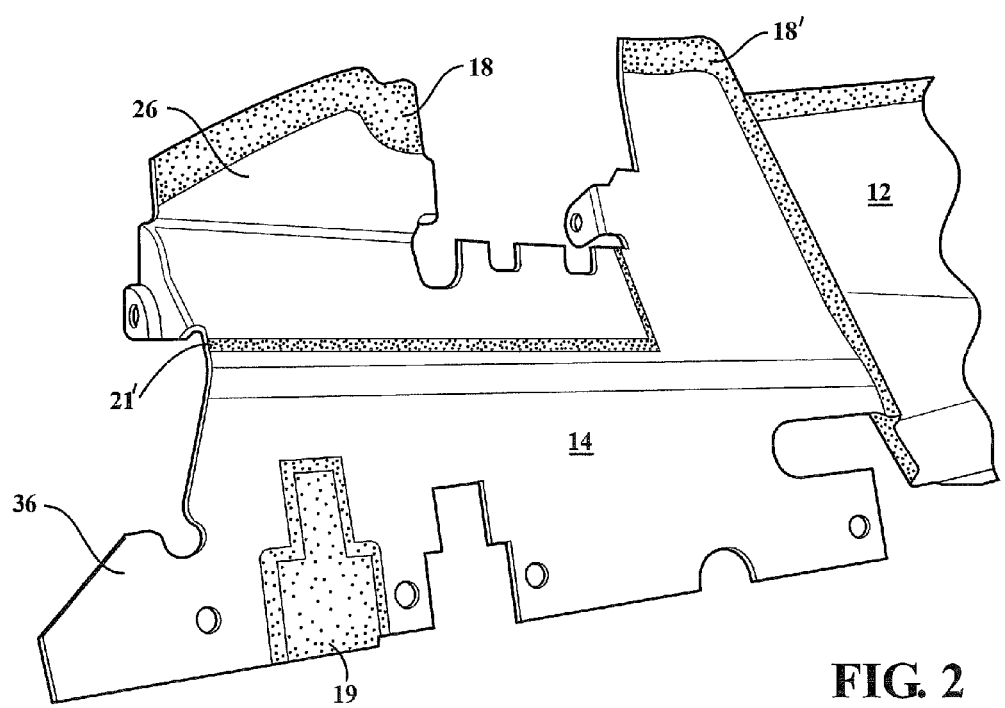
FIG. 2 is an enlarged perspective view of a first side of the baffle and better illustrating the integrated nature of the first and second materials for assisting in foldability and reconfigure-ability such as attachment to an associated vehicle bumper beam.
Figure 3:
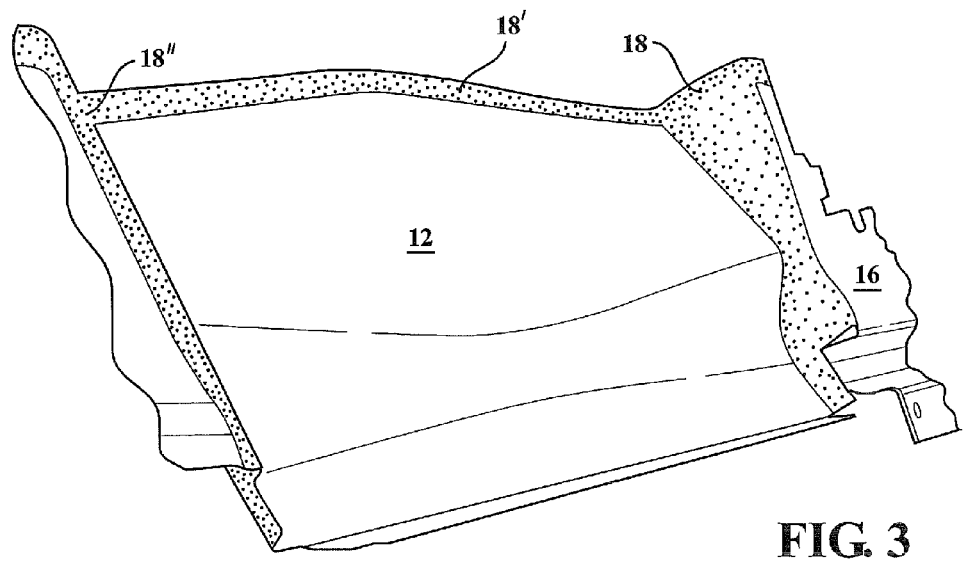
FIG. 3 is an enlarged perspective of a middle/bottom component also shown in FIG. 1.
Figure 4:
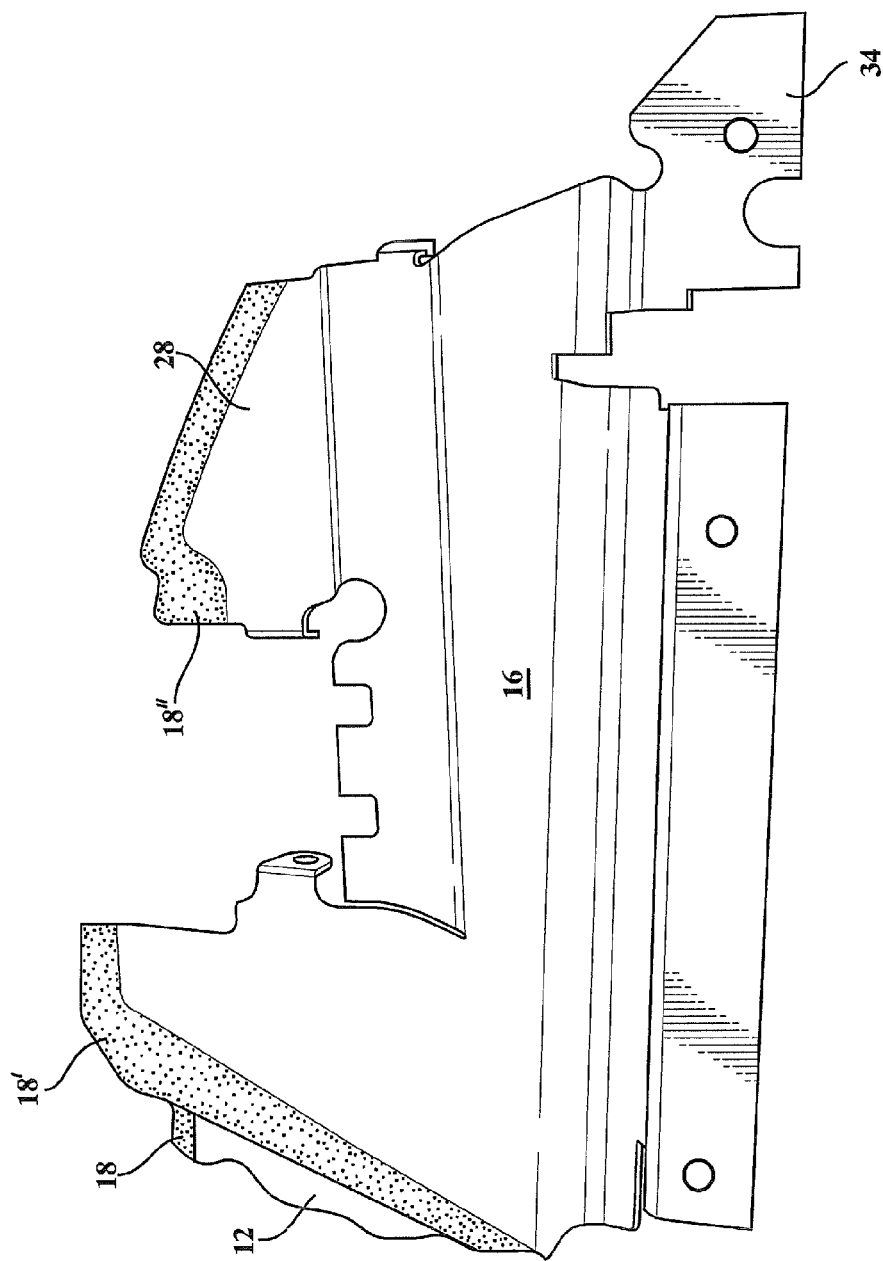
FIG. 4 is an enlarged perspective view of a second side of the baffle shown in FIG. 1 and, which is substantially mirror opposite to that depicted in FIG. 2, and again illustrating the integrated nature of the first and second materials for assisting in foldability and reconfigure-ability such as attachment to an associated vehicle bumper beam.

As further depicted in succeeding FIGS. 2-4, the lower baffle 10 is provided as a one piece three panel flexible design which is produced in one instance by such as a two shot injection molding or like operation in which harder and multiple/foldable panels are hingedly interconnected by a softer interstitial and boundary defining material. In one non-limiting application, the baffle includes a central body panel 12 and two opposite interconnected side portions 14 and 16 formed from a first shot harder material such as for example an olefinic filled polypropylene.

A softer interconnecting/boundary defining material 18 is provided by a second shot of softer polymeric material, such as by non-limiting example a thermoplastic elastomer (TPE) or thermoplastic vulcanite (TPV). The softer material is depicted by a plurality of edge trim and interconnecting portions established and around and between the individual harder plasticized panels 12, 14 and 16. For ease and practicality of representation these as shown at 18, 18', 18" and are represented by spaced apart flexible trim portions in each of repetitive and reverse indicating fashion for sides 14/12 (FIG. 2) and 12/16 (FIG. 4) respectively.

Figure 5:
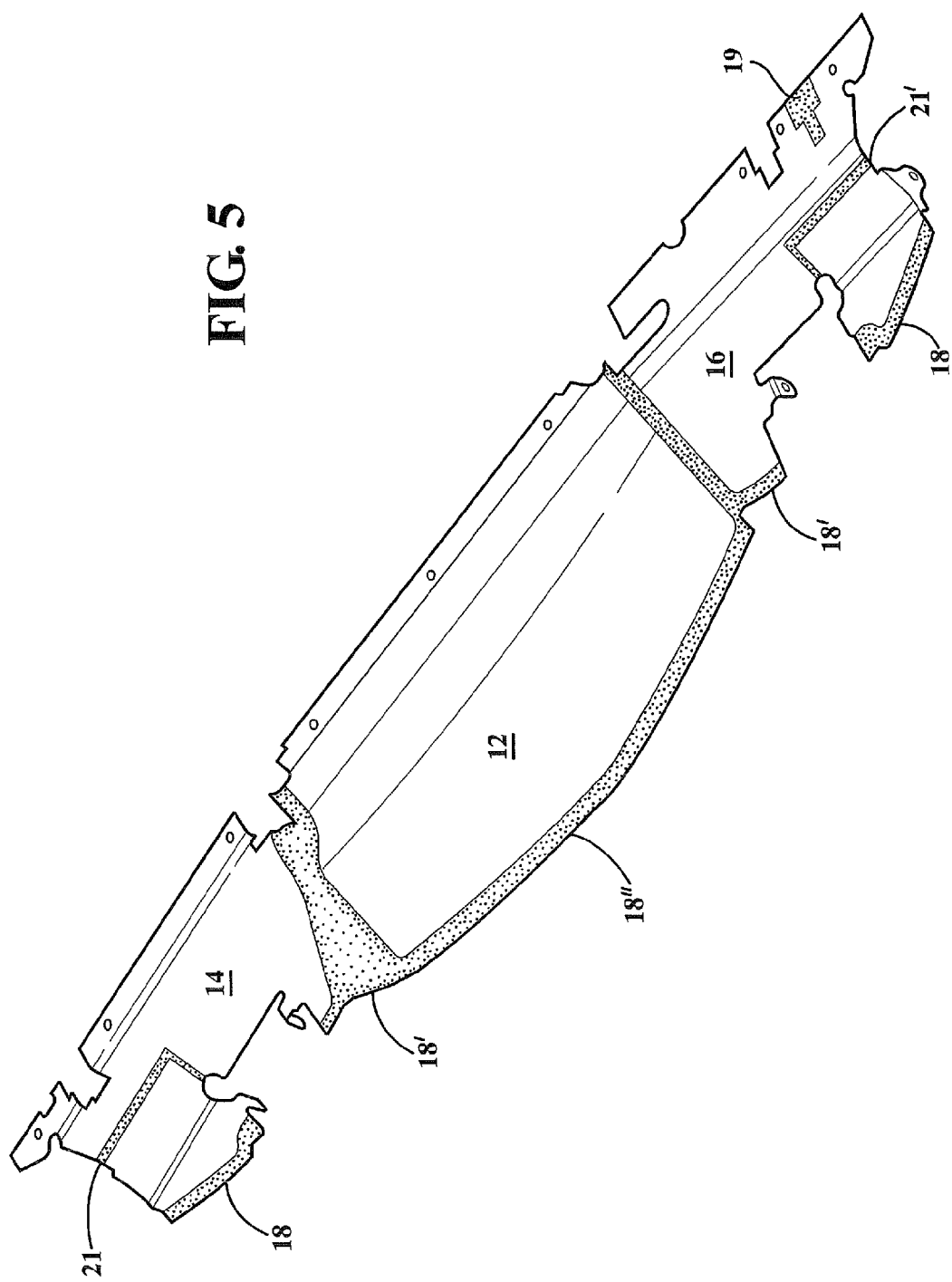
FIG. 5 is a further schematic perspective of the three sided, one piece, two shot flexible baffle design according to the present invention.

As further depicted, the second shot (softer) material 18, 18' and 18" extends along interfaces established between each of the panels 12, 14 and 16 in order to provide inter-flexibility. Additional softer edge trim locations are also defined at 19 (see FIGS. 1 and 5) in proximity to selected side panels (e.g. at 14), this in order to provide addition reconfigure-ability of the panel when engaging variously sized fascia and condenser shapes associated with different vehicle models.

The configuration of the three sided baffle is such that it conveniently ships flat in multiple stacked fashion and, given further that it doesn't need to be assembled in multiple pieces, is further capable of being quickly installed by being conformed or bent into a desired shape for surrounding an existing vehicle radiator. As will also be described in additional detail, the template design associated with the edge profiles of the opposite and flexibility connected sides 14 and 16 is further such that, upon being folded upwardly following pre-positioning of the central interconnecting panel 12 underneath the radiator and during installation, the sides are capable of being quickly reconfigured (if need be) and installed to varying dimensioned vehicle fascias and radiator/condenser configurations.

Figure 6:
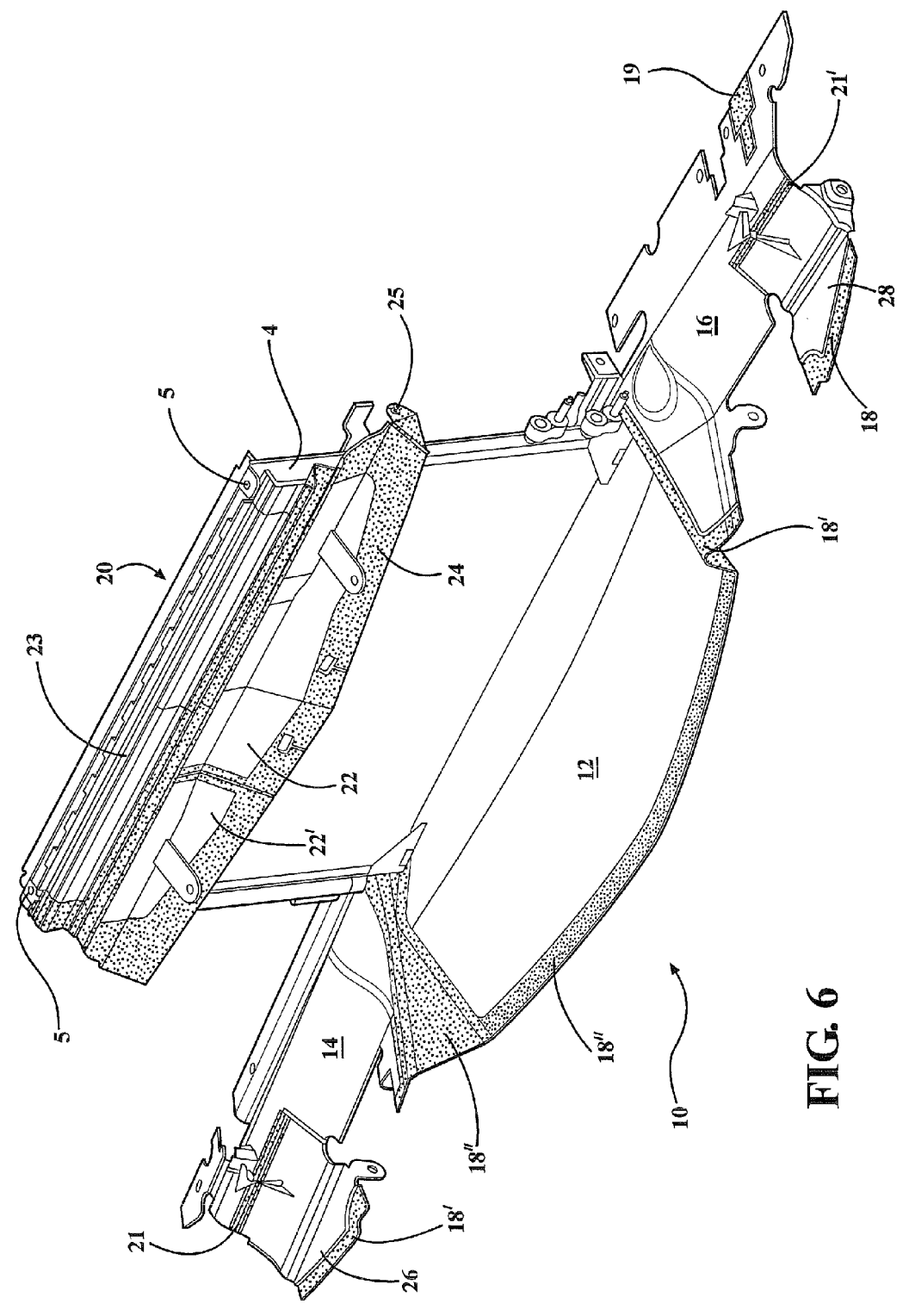

Referring to FIG. 6, an initial pre-assembly view is shown of the three sided flexible baffle article in combination with a separate assembleable upper baffle, further shown at 20 in FIG. 6 et seq. As shown, additional flexible locations 21 and 21' are depicted and which facilitate the pivotal folding of wing portions (see as described subsequently at 26 and 28) associated with each of the side panels 14 and 16.

As further depicted, the upper baffle 20 is also provided as a single piece and double shot material including harder first shot components 22 and 22', as well as upper spaced and horizontally extending component 23, around and between which is configured a combined outer perimeter/trim and interior extending second shot (softer) portion 24 for providing the upper baffle with a further measure of flexibility during installation in proximity to and underneath the cooling module 2 (again FIG. 10).

During the initial installation sequence, the lower baffle 10 is pressed up onto the lower radiator flange (not shown) by the operator (see opposite and outwardly facing mounting locations 25 associated with the upper baffle 20), while the upper baffle 20 is hung onto the upper condenser flange 5. As with the lower baffle 10, the upper baffle 20 is again shipped flat in multiple stacked fashion, following which it is constructed so that the harder first shot components 22 and 23 (similar to panels 12, 14 and 16 associated with the lower baffle) are again capable of being bent or angularly positioned relative to the softer perimeter and interior extending trim 24.

Figure 7:
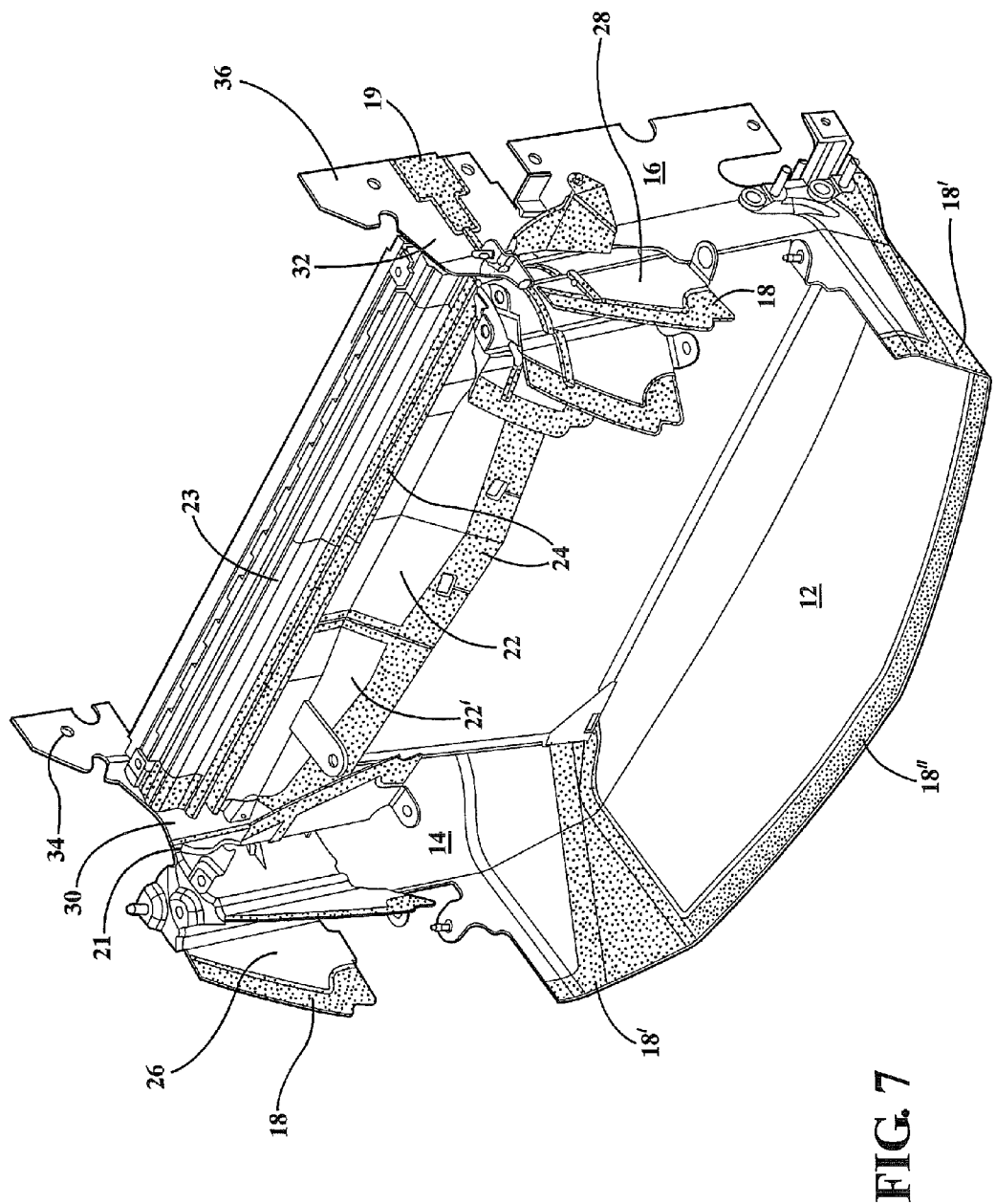
FIG. 7 is a succeeding and intermediate assembly view in which pivotal flap or wing portions associated with the sides engage, in snap fit fashion, opposite end locations associated with the upper baffle.

FIG. 7 is a succeeding and intermediate assembly view in which the pivotal flap or wing portions 26 and 28 associated with the sides 14 and 16 of the lower baffle 10 engage, in snap fit fashion, opposite end locations 30 and 32 associated with the upper baffle 20. These side wings 26 and 28 are then swung inwardly on the soft living hinges established by the second shot material and snapped into closed positions utilizing the molded-in snap features.

The present design allows the side wings 26 and 28 to be maintained out of the way while the chassis design is married to the vehicle body within the assembly plant. During installation, the operator rotates additional portions 34 and 36 associated with the sides 14 and 16 of the lower baffle up and onto the radiator end side tanks (not shown) and then fasten them into position.

Figure 8:
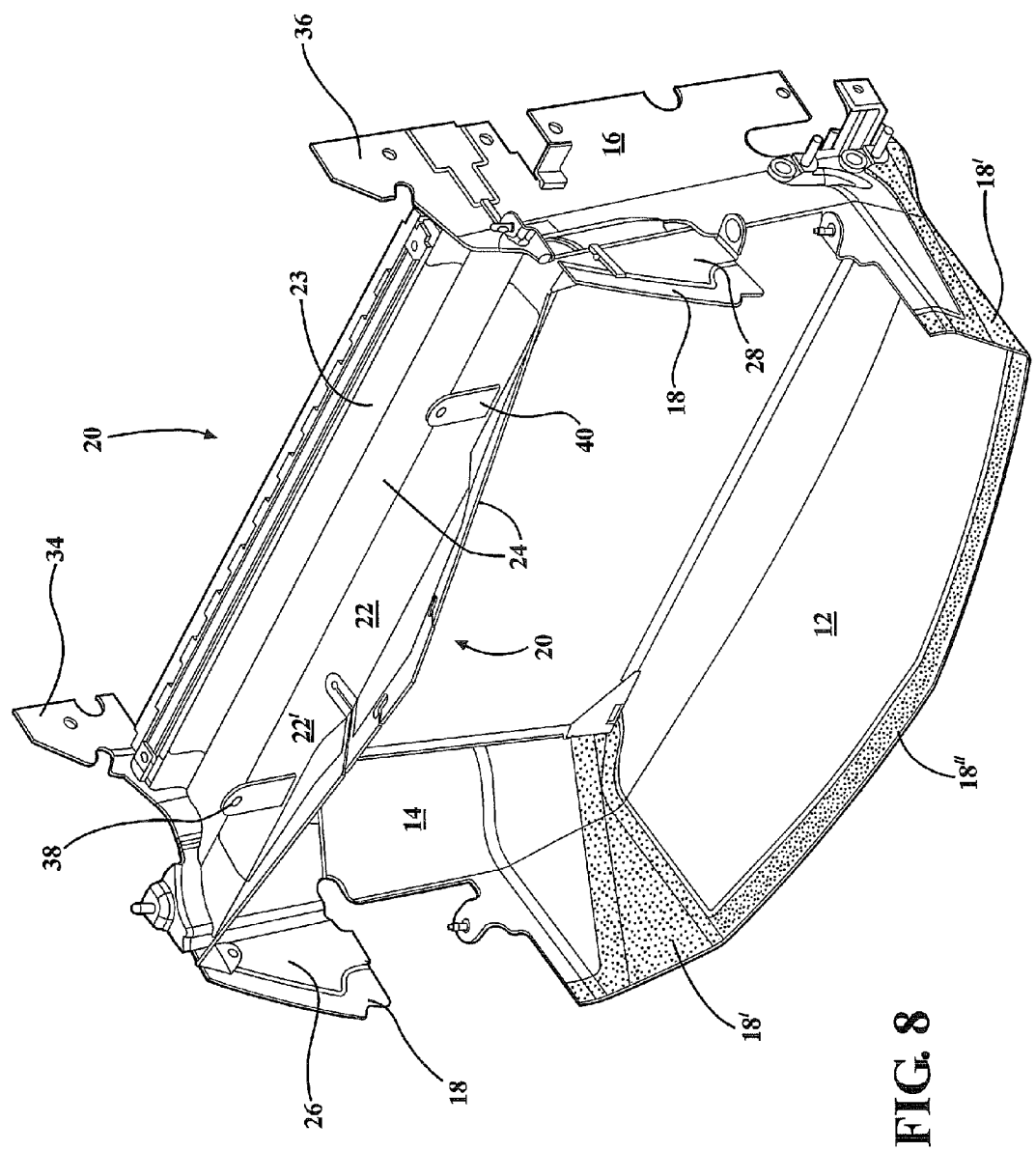

FIGS. 8 and 8A respectively illustrate both perspective and enlarged partial completed assembly views in which the upper baffle 20 is hinged and extended (see first shot material configured bracket mounts 38 and 40) to assemble to the main support bracket. Concurrently, the side pivoting flaps or wings 26 and 28 (FIG. 8A) are pivoted into engagement with the associated vehicle bumper beam (not shown). Following installation of the baffle 20 to the specific vehicle chassis, the pivoting wings 26 and 28 are capable of being easily unsnapped and swung outwardly (see directional arrow in FIG. 8A), past the bumper beam and pinned into place.

Figure 9A:
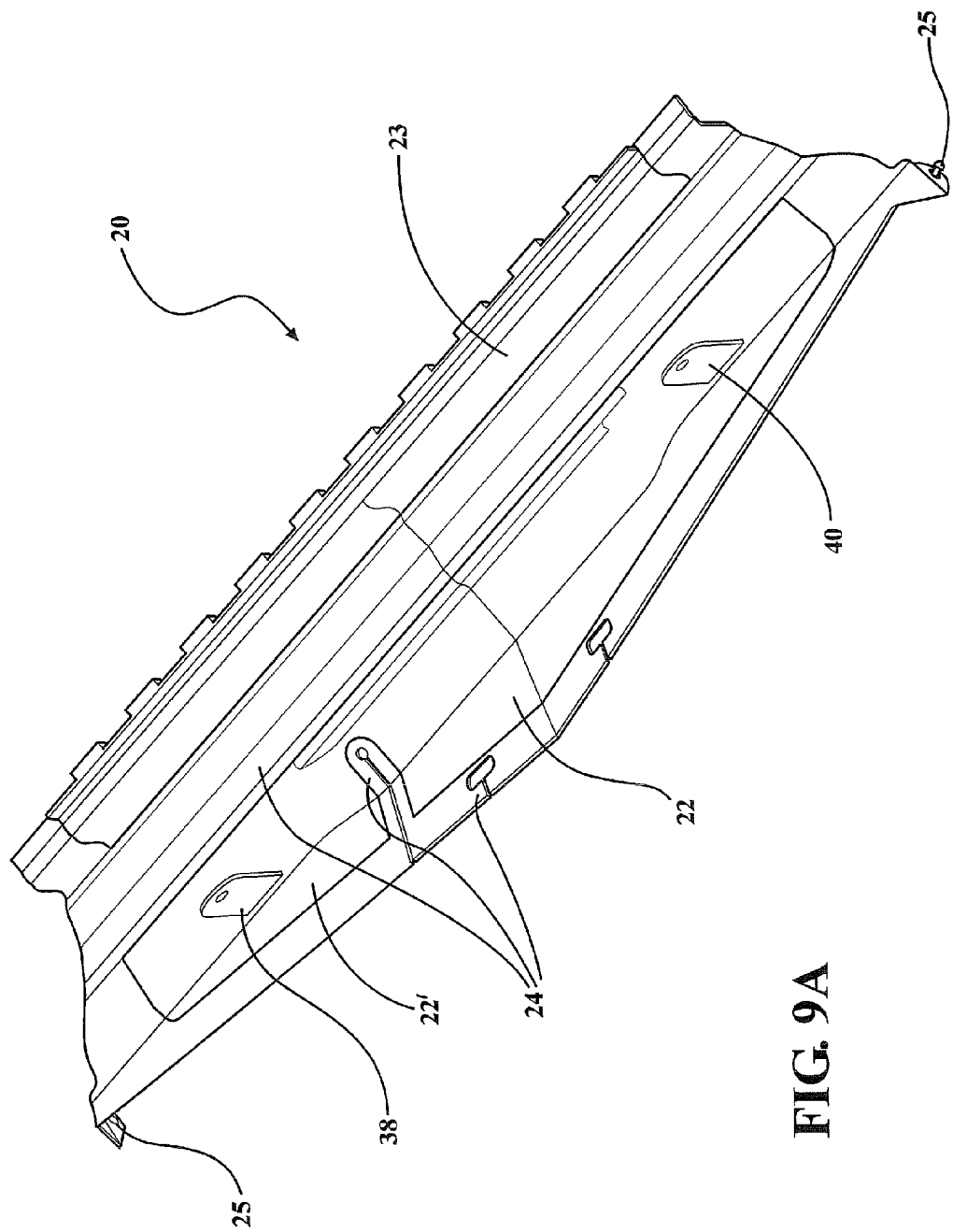
FIGS. 9A and 9B illustrate the baffle upper in each of "as molded" and "extended" positions in order to configure for fitting several different condenser positions and vehicle front fascia designs.
Figure 9B:
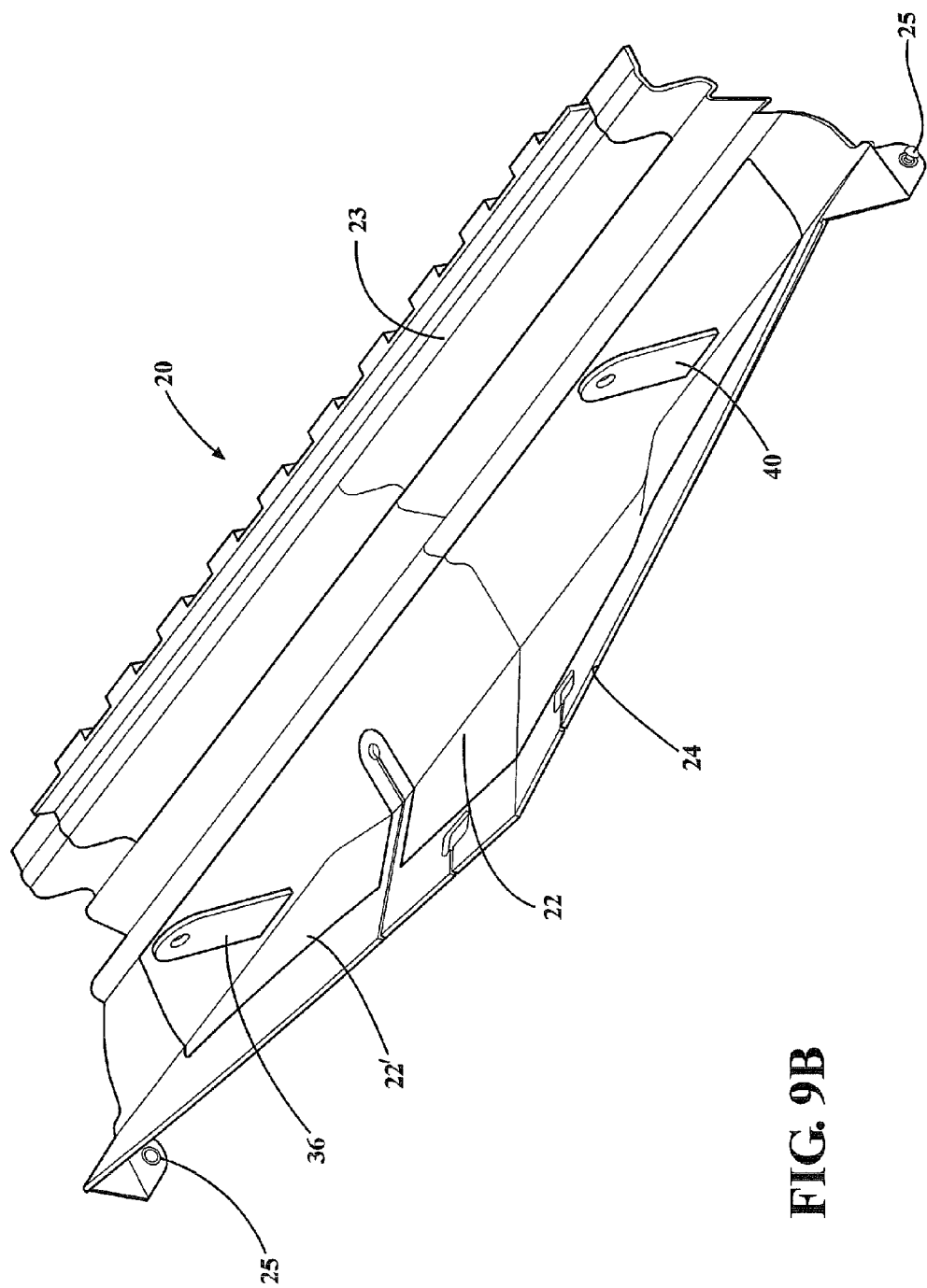
Figure 12:
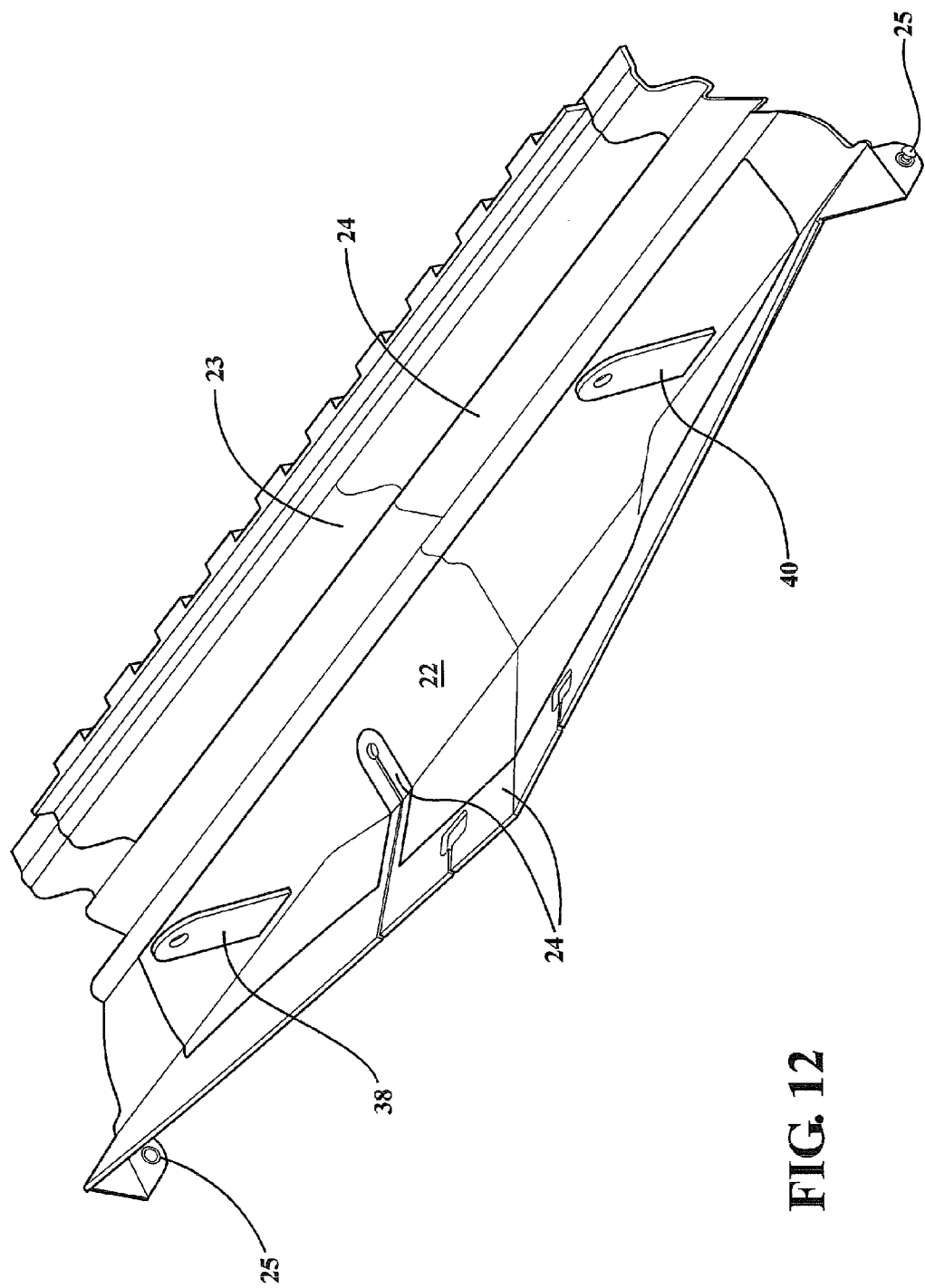
FIG. 12 is another illustration of the upper baffle in an initial and "as molded" position as shown in FIG. 9A.
Figure 13:
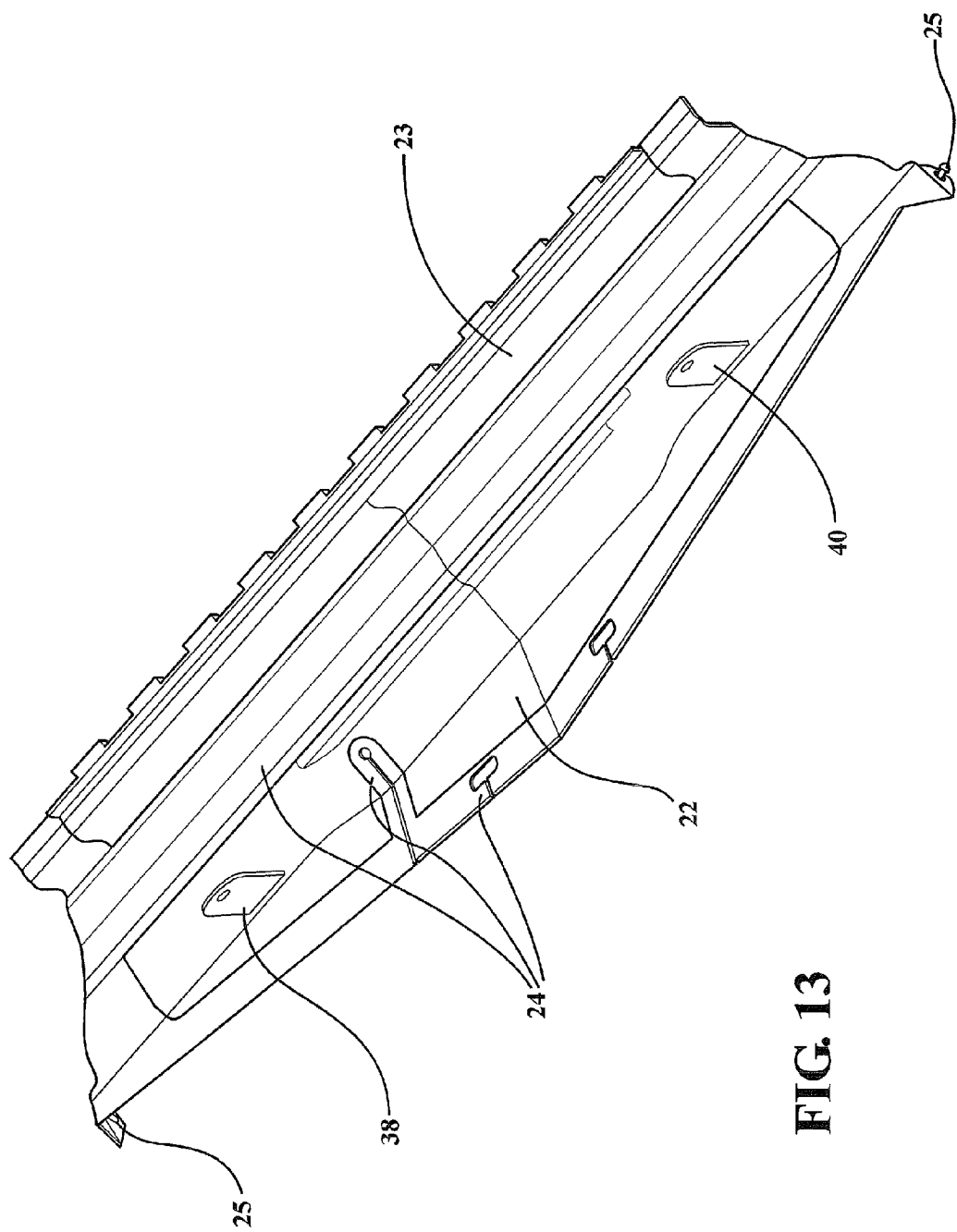
FIG. 13 is another illustration of the upper baffle in the "extended" position of FIG. 9B.

FIGS. 9A and 9B illustrate the upper baffle 20 in each of "as molded" and "extended" positions as respectively depicted (see also FIGS. 12 and 13). This feature allows one part to be reconfigured (such as any combination of bending and removal of any pieces) in order to configure for fitting several different condenser positions and vehicle front fascia designs.

Figure 10B:
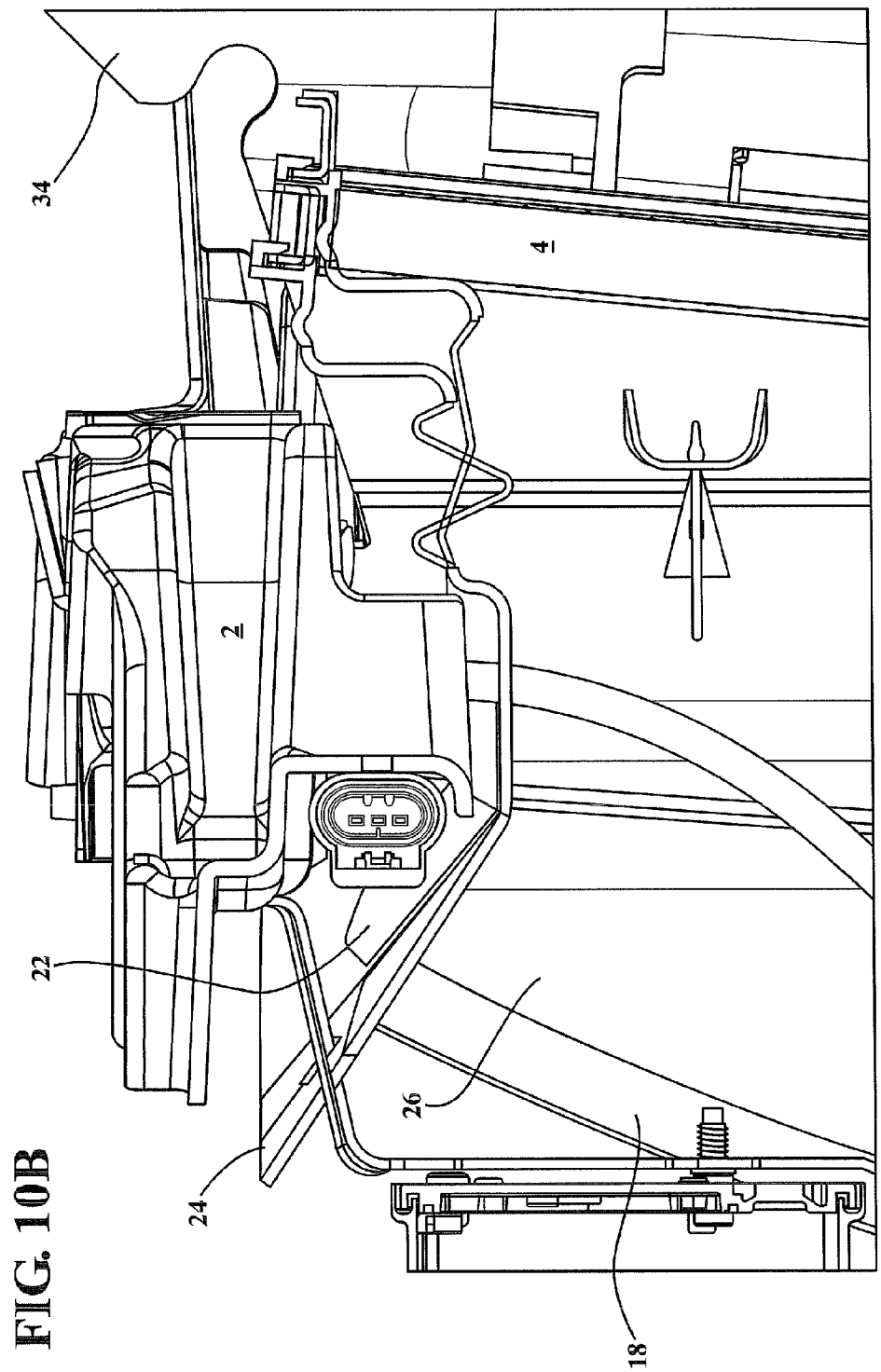

FIGS. 10A and 10B are isometric views depicting portions of the upper 20 and lower 10 baffles in installed arrangement relative to a vehicle radiator 4 and upper mounted cooling module 2. The nature of these illustrations is to readily depict the manner in which the baffle components can be easily and quickly manipulated via bending, folding or trimming away of selected template portions, in order to install underneath and around both the cooling module 2 and associated radiator condenser 4 and associated bracketry.

FIG. 11 is a further end cutaway view similar to that depicted in FIGS. 10A and 10B and further illustrating the arrangement of the upper 20 and lower 10 baffles relative to the upper cooling module and condenser of the associated radiator. The cross sectional view shown best illustrates the manner in which the installation configuration of the upper baffle 20 operates to direct engine air flow downwardly to the cooling module during flow of the same continuously through the front fascia.

Figure 14:
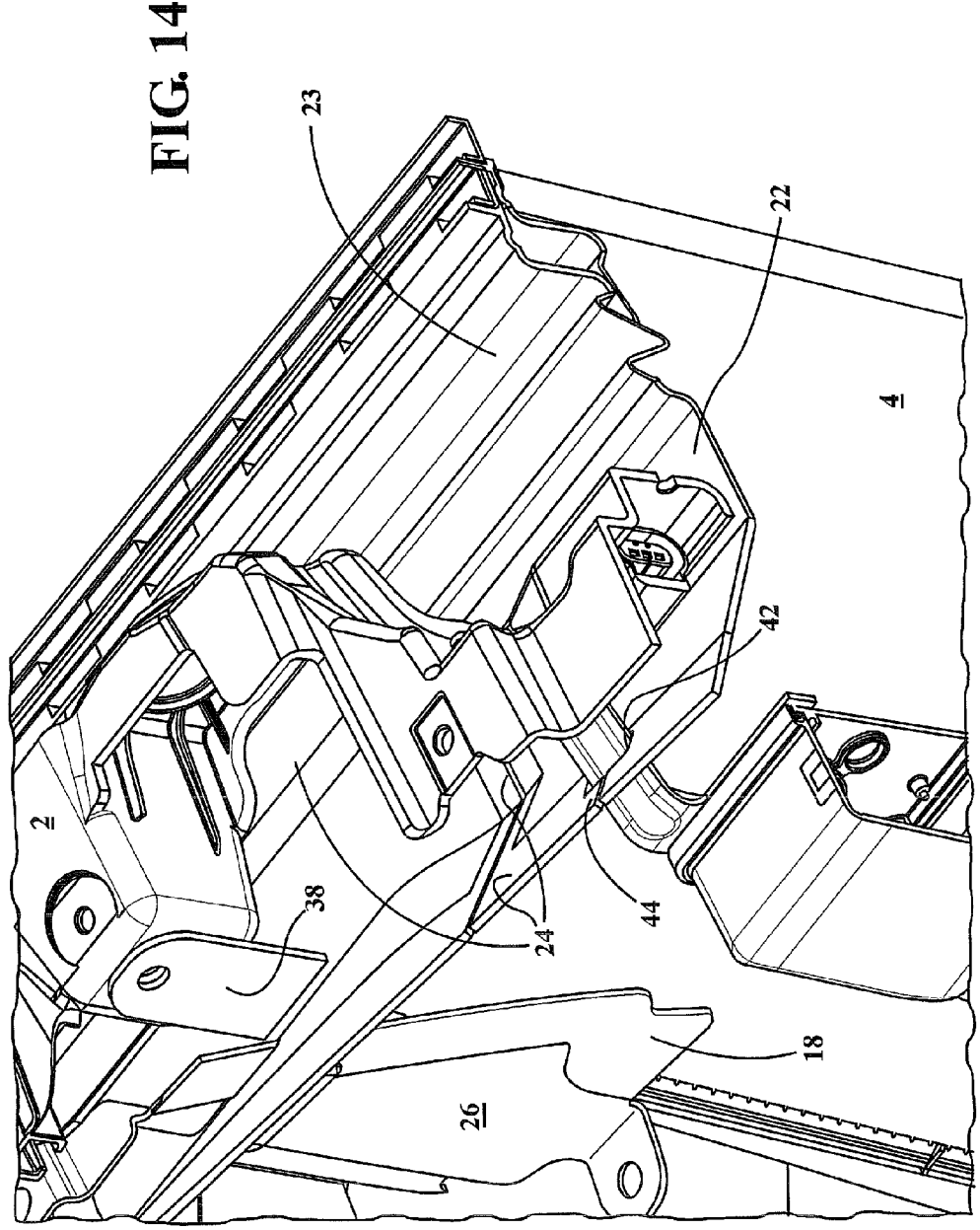
FIG. 14 is a rotated iso assembly view similar to that shown in FIG. 11 and which better illustrates the adaptability of the baffle construction for fitting different condenser positions.

Finally, FIG. 14 is a rotated iso assembly view similar to that shown in FIG. 12 and which better illustrates the adaptability of the baffle construction for fitting different condenser positions. Also shown in better detail is both the configuration and manner in which the combination of harder (first shot) portions 22 and 23 and softer second shot 24 locations are collectively manipulated in order to install the upper baffle above the radiator condenser in supporting fashion around and underneath the associated cooling module 2. The configuration of the softer material edge profile with cutout incisions is also better shown, such as depicted at 42 and 44 in FIG. 14, and which facilitates fast and easy installation around such as bracketry and wire harness locations associated with the vehicle architecture.

The flexible two shot baffle design in use assists in providing more aerodynamic efficiency and enhanced mileage of associated vehicle installations by establishing a "touch" condition whereby the two shot component assemblies contact critical locations along the radiator bracketry and upper located cooling module to optimize desired airflow with the surrounding components and thereby establish proper sealing where desired. As previously discussed, the softer second shot material provides living hinge locations to facilitate bending and manipulation of the harder first shot panel locations around, behind and under the radiator and associated vehicle architecture during loading/installation.

As such, the resulting two shot created part requires only one mold for creation and subsequent installation into a variety of vehicle applications. This is further accommodated by designing various template post mold "punch out" locations (see such as previously again shown at 18' in FIG. 1), this allowing for quick adaptation of a given baffle into different versions required for model differences and engine options.

Also, and as again previously noted, the ability to produce both the lower and upper baffles 10 and 20 in a substantially flattened profile allows for ease of multiple shipping. As further noted, the lower and upper baffles can be employed separately or in combination in order to tailor the application for optimization of vehicle sealing and aerodynamic airflow.

Having described our invention, other and additional preferred embodiments will become apparent to those skilled in the art to which it pertains, and without deviating from the scope of the appended claims.

I claim:

1. A baffle construction for installation within an engine compartment of a vehicle constructed of a two part injection molded material and comprising an integrally formed body including a first harder panel section and a second softer interconnecting hinge, said body further having a three sided article including a central body panel and two opposite interconnected side portions.

2. The invention as described in claim 1, said panel and side portions each having a specified shape and size and being formed from a first shot harder material including at least an olefinic filled polypropylene.

3. The invention as described in claim 1, further comprising a plurality of living hinges located around and between said body and side portions.

4. The invention as described in claim 3, said living hinges each having a specified shape and size and being formed from a second shot softer material including at least one of a thermoplastic elastomer (TPE) or thermoplastic vulcanite (TPV).

5. The invention as described in claim 1, further comprising a secondary article including an upper baffle assembled along with said lower baffle to define a four sided box-like structure around the radiator.

6. The invention as described in claim 5, said upper baffle further comprising individual harder first shot panel portions, between and around which are formed additional softer second shot hinge and pivot locations.

7. The invention as described in claim 6, at least one of said three sided article and said secondary article incorporating reconfigurable portions to facilitate installation to varying sized and dimensioned vehicle fascias, bumper bars, radiators and the like.

8. A multi-sided and lay flat baffle construction for installation within an engine compartment of a vehicle, comprising:
    a three sided body including a central panel and opposite interconnected side panels, said body constructed of a two part injection molded material;
    said panels each further being constructed of a first harder material; and
    a second softer material defining interconnecting hinges between and around said panels such that said body is converted from a first lay flat condition to a second configured position adapted to surround a radiator and associated cooling module positioned within the engine compartment of the vehicle.

9. The invention as described in claim 8, said panel and side portions each having a specified shape and size and being formed from at least an olefinic filled polypropylene.

10. The invention as described in claim 9, said softer material further comprising a plurality of living hinges located around and between said body and side portions.

11. The invention as described in claim 10, said living hinges each having a specified shape and size and being formed from at least one of a thermoplastic elastomer (TPE) or thermoplastic vulcanite (TPV).

12. The invention as described in claim 8, further comprising an upper baffle assembled along with said multi-sided body to define a four sided box-like structure around the radiator and upper cooling module.

13. The invention as described in claim 12, said upper baffle further comprising individual harder first shot panel portions, between and around which are formed additional softer second shot hinge and pivot locations.

14. The invention as described in claim 13, at least one of said three sided interconnected body and said upper incorporating reconfigurable portions to facilitate installation to varying sized and dimensioned vehicle fascias, bumper bars, radiators and the like.

15. A multi-sided baffle construction for installation within an engine compartment of a vehicle, comprising:
    a three sided body including a central panel and opposite interconnected side panels, said body constructed of a two part injection molded material;

said panels each further being constructed of a first harder material;

a second softer material defining interconnecting hinges between and around said panels such that said body is converted from a first lay flat condition to a second configured position adapted to surround a radiator positioned within the engine compartment of the vehicle; and an upper baffle assembled along with said multi-sided body to define a four sided box-like structure around the radiator and an upper positioned cooling module, said upper baffle further comprising individual harder first shot panel portions, between and around which are formed additional softer second shot hinge and pivot locations.

16. The invention as described in claim 15, said panel and side portions each having a specified shape and size and being formed from at least an olefinic filled polypropylene.

17. The invention as described in claim 15, said softer material further comprising a plurality of living hinges located around and between said body and side portions.

18. The invention as described in claim 15, said living hinges each having a specified shape and size and being formed from at least one of a thermoplastic elastomer (TPE) or thermoplastic vulcanite (TPV).

19. The invention as described in claim 15, at least one of said three sided interconnected body and said upper incorporating reconfigurable portions to facilitate installation to varying sized and dimensioned vehicle fascias, bumper bars, radiators and the like.

* * * * *